US011367303B2

(12) United States Patent
Maurer et al.

(10) Patent No.: US 11,367,303 B2
(45) Date of Patent: Jun. 21, 2022

(54) SYSTEMS AND METHODS OF AUTOMATED BIOMETRIC IDENTIFICATION REPORTING

(71) Applicant: AWARE, INC., Bedford, MA (US)

(72) Inventors: James M. Maurer, Bow, NH (US); Jennifer Lynn Fredette, Hudson, NH (US); James E. Michaels, N. Billerica, MA (US)

(73) Assignee: AWARE, INC., Bedford, MA (US)

( * ) Notice: Subject to any disclaimer, the term of this patent is extended or adjusted under 35 U.S.C. 154(b) by 0 days.

(21) Appl. No.: 17/338,208

(22) Filed: Jun. 3, 2021

(65) Prior Publication Data

US 2021/0383095 A1 Dec. 9, 2021

Related U.S. Application Data

(60) Provisional application No. 63/036,112, filed on Jun. 8, 2020.

(51) Int. Cl.
*G06V 40/12* (2022.01)
*G06F 16/583* (2019.01)
*G06V 40/50* (2022.01)

(52) U.S. Cl.
CPC ........ *G06V 40/1371* (2022.01); *G06F 16/583* (2019.01); *G06V 40/1376* (2022.01); *G06V 40/50* (2022.01); *G06V 2201/10* (2022.01)

(58) Field of Classification Search
CPC .......... G06V 40/1371; G06V 40/1376; G06V 40/50; G06V 2201/10; G06F 16/583
See application file for complete search history.

(56) References Cited

U.S. PATENT DOCUMENTS

2011/0164793 A1* 7/2011 Maurer et al.
2014/0317100 A1* 10/2014 Harding
2015/0154260 A1* 6/2015 Partington et al.

* cited by examiner

*Primary Examiner* — Abhishek Sarma
(74) *Attorney, Agent, or Firm* — Jason H. Vick; Sheridan Ross, PC

(57) ABSTRACT

Methods and systems for of generating reporting data in an automated, efficient, and risk-free fashion relating to an identification match relating to a probe image are disclosed. Methods include automatically capturing a comparison area in the probe image and a comparison area of a candidate image based on examiner input; facilitating a determination of whether a similarity or a dissimilarity exists between the comparison area in the probe image and the comparison area of the candidate image; automatically recording metadata based on the determination of whether the similarity or the dissimilarity exists between the comparison area in the probe image and the comparison area of the candidate image and updating an audit log; and generating a report comprising the metadata.

20 Claims, 15 Drawing Sheets

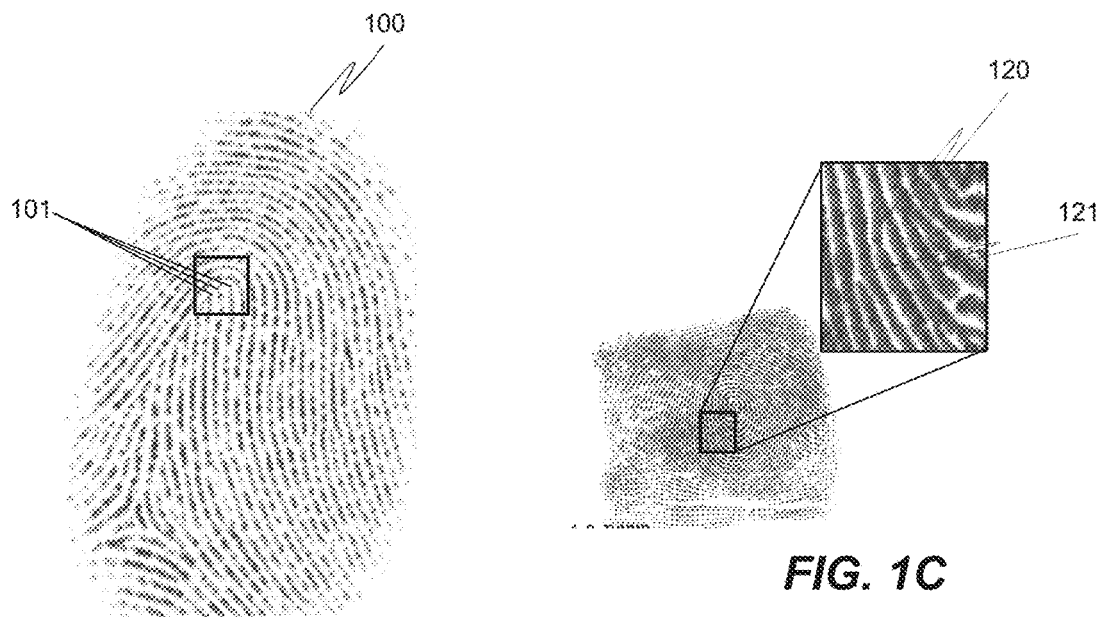
FIG. 1A
FIG. 1C
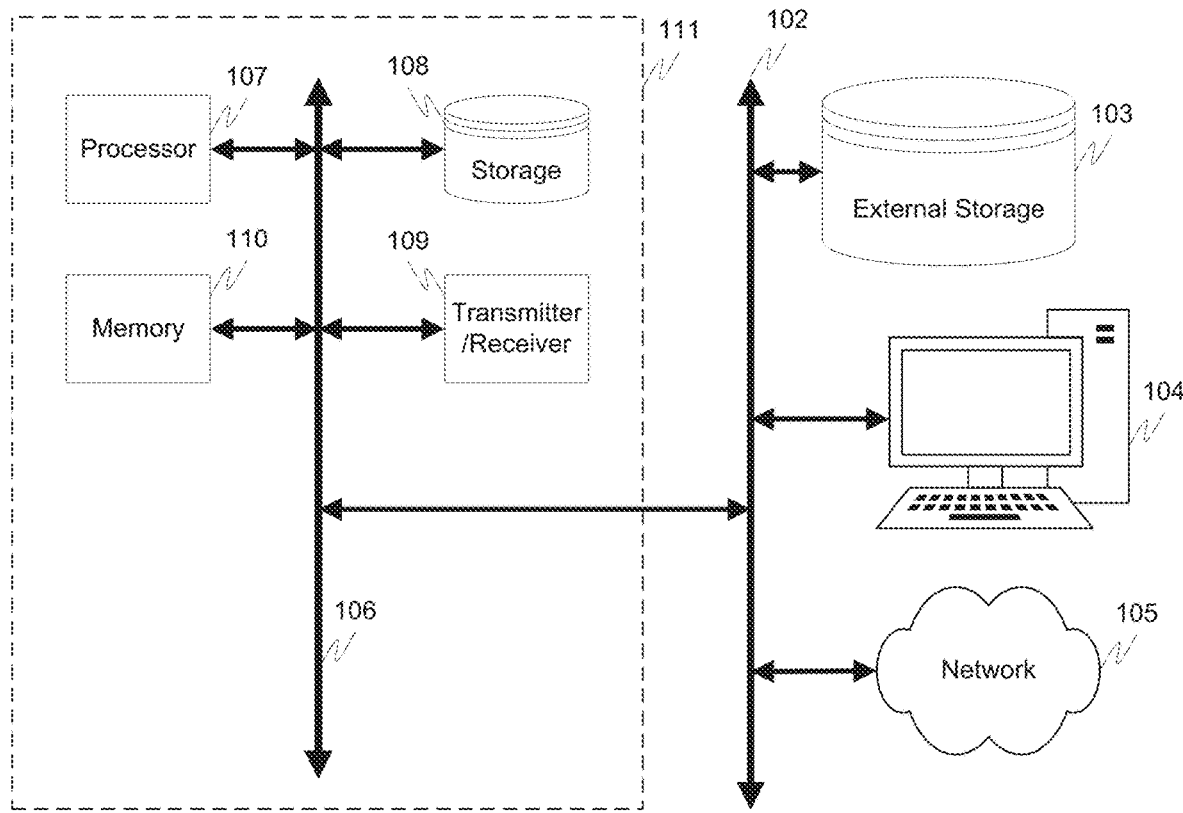
Fig. 1B

Candidate List Information

Candidate Print Details

Candidate Number: 1 of 8
Candidate Name: Smith, John
SSN: ###-##-####
TCN: 0928345
Finger Position: Left Thumb
Impression Type:
Date Printed: 2025-05-05
Scanning Resolution:
Compression Format:

Lift Region of Interest

Latent Details
Lift Identifier:
Lift Filename:
Latent Identifier:
Latent Coordinates (X, Y):

Latent Comparison

Candidate Comparison Details
TCN:
Finger Position: 03 Right Middle

Lift Comparison Details
Lift Identifier:
Latent Identifier:

Latent Comparison Summary

Candidate Comparison Details
TCN:
Finger Position: 03 Right Middle

Snapshot 1 Snapshot 2 Snapshot 3

Lift Comparison Details
Lift Identifier:
Latent Identifier:

Snapshot 1 Snapshot 2 Snapshot 3

SYSTEMS AND METHODS OF AUTOMATED BIOMETRIC IDENTIFICATION REPORTING

CROSS REFERENCE TO RELATED APPLICATIONS

The present application claims the benefit of and priority, under 35 U.S.C. § 119(e), to U.S. Provisional Application Ser. No. 63/036,112, filed on Jun. 8, 2020, entitled "SYSTEMS AND METHODS OF AUTOMATED BIOMETRIC IDENTIFICATION REPORTING," the entire disclosure of which is hereby incorporated by reference, in its entirety, for all that it teaches and for all purposes.

TECHNICAL FIELD

The present disclosure generally relates to biometric identification systems and more particularly to systems and methods of automatically reporting fingerprint comparison data.

BACKGROUND

The prevalent use of computers, smart-phones, tablets, and other electronic devices generates an ever-increasing demand for digital security. Traditional means for securing digital devices include passwords and personal identification numbers (PINs). Such traditional security means are associated with a number of issues, for example passwords and PINs may be stolen, lost, or forgotten.

As electronic devices become more technologically advanced, new means for digital security have been created. Biometric security systems, such as fingerprint-recognition systems, are one approach to digital security. Biometric traits like fingerprints, iris, and face are increasingly being used for identification and access control. The use of biometrics has significant advantages compared to traditional methods like passwords and PINs. Unlike passwords and PINs, biometrics ordinarily cannot be stolen, lost, or forgotten. Among the different biometrics, fingerprints are very popular and have a number of strengths. Fingerprints are unique to every individual, non-invasive to acquire, and do not change with time.

Fingerprint images represent finger friction ridges as patterns of black and white regions called as ridges and valleys. Ridges correspond to the raised portions of the epidermal ridges, and valleys correspond to the sunken sections of the epidermal ridges. Depending on the ridge pattern, a fingerprint can be classified to one of five categories: left loop, right loop, arch, tented arch, and whorl. The ridge patterns in loop images enter the fingerprint from one side, form a loop, and exit from the same side. Ridges in arch images start from one side of the finger, form an arch shape in the center region, an exit from the other side. Tented arch images are similar to arches, but the ridges have a sharper rise and are discontinuous in the center region. Whorl images consist of ridges, which turn around by entire 360 degrees.

Fingerprints are further defined by the patters formed by the friction ridges. These features are termed minutiae. Each ridge can terminate as a ridge ending or split in a bifurcation. Ridges can be further identified as short ridges (two ridge endings close together on a single ridge), dots (very short ridges), and islands (two bifurcations that form a short valley).

Additional third-level details can further define a fingerprint. These include sweat pores as well as scarring and wrinkles. Each of these features have levels of permanence that allow for comparison. Friction ridges, ridge endings, bifurcations and pores have lifelong permanence while scars and wrinkles are potentially stable for a shorter amount of time. The set of minutiae are encoded within the computer as a template. Templates as well as the full set of minutiae can be used to compare two fingerprint images to determine if they came from the same individual. This comparison can be accomplished by a skilled examiner or by a computer algorithm.

While embodiments of the present application are generally described in relation to building reports relating to fingerprint data, it should be appreciated the same or similar techniques, systems, and methods can be applied in the same or similar ways to build reports relating to other types of data such as, but not limited to, palm, facial data, voice data, eye data (e.g., iris and/or retina data), etc.

Fingerprint matching problems are of two types: verification and identification. Verification, i.e., one-to-one matching, verifies that a person is who they claim to be. Verification is often done by matching the subject's fingerprints with previously stored information collected in a controlled environment. Identification, i.e., one-to-many matching, identifies a person by matching his or her fingerprints against a database of fingerprints. A database of fingerprints is described as a gallery and an input fingerprint being searched is described as a probe. As used herein, a gallery may refer to a database of any type of biometric data such as fingerprints, face data, voice, iris, retina data, etc. A probe may be any type of biometric data used as an input to search a database or gallery. A database may be stored on a hard-drive storage system and may be connected to and accessible from a network and/or server. A network connected fingerprint database may allow a number of devices in a number of locations to input probe fingerprints to be matched across a shared database.

Typically, the set of minutiae points of a fingerprint image are used as reference points. The minutiae may be used as a map to describe the fingerprint. Once an image is registered, its minutiae points may be determined and used to identify candidates to be passed to the next stage. The candidates are usually fingerprints in which the minutiae patterns are of the same type, relation, and layout as the probe.

Fingerprint examiners are typically trained professionals and use manual methods and computer systems to compare a probe fingerprint image with one or more candidate images. Fingerprint examiners review and compare certain areas including minutiae points, core type and orientation, and third level detail between the probe and candidate images to determine what similarities and/or dissimilarities exist. The goal of a fingerprint examiner may be to determine whether a candidate image is a match or is not a match for a probe image. Using software, a fingerprint examiner typically builds a report of their findings. Reports are required to have great detail such that the examiners findings and process can be documented and entered as evidence under rules of courts. Reports require information not only relating to whether a candidate is a match and whether an identification has been found, but also the choices and analysis made by a fingerprint examiner in making the identification decision. Finally, reports must document data regarding both the original probe and candidate images and their history.

Contemporary methods of generating and displaying reporting data relating to whether a probe fingerprint has been identified or has not been identified are difficult to use, inefficient, and fail to generate complete metadata and decision artifacts for external use in reports of varying formats. Traditional techniques have several failings that impact operator efficiency, data integrity/accuracy, and therefore impact the rules of evidence.

Currently fingerprint examiners are often required to use multiple applications for report generation. The comparison of the digital images is carried out with one application, the comparison snapshot images are generated in a second, while the report is compiled in yet another. The requirement to change applications often during an examination increases the required number of steps and therefore the overall time on task. Secondly, by using multiple applications the number of steps required are increased. With each manual step the chance of introducing errors into the process is also increased. This includes but is not limited to manual recording (data entry) errors, copy and paste errors, and file association errors (adding the incorrect file). Any incorrect recording of case and/or comparison data can jeopardize both further reviews as well as presentation in a court of law.

BRIEF DESCRIPTION OF THE DRAWINGS

The present disclosure is described in conjunction with the appended figures, which are not necessarily drawn to scale:

FIG. 1A is an illustration of an example fingerprint with a core point indicated;

FIG. 1B is an illustration of an example system operable to perform embodiments of the disclosure in accordance with one or more embodiments of the disclosure;

FIG. 1C is an illustration of an example fingerprint with two minutiae;

DETAILED DESCRIPTION

Figure 2A:
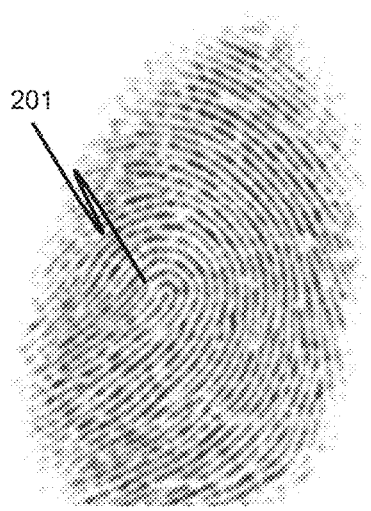
FIG. 2A is an illustration of an example fingerprint.

The ensuing description provides embodiments only and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Example embodiments described herein propose an automated approach to generating reports for fingerprint examiners. Example embodiments, in contrast to the prior art, are automated, easy to use, efficient, and generate complete metadata and decision artifacts for use in external use in reports of varying formats. Example embodiments described herein apply an automated approach in which any and/or all information relating to decisions and actions made by a fingerprint examiner in comparing a probe fingerprint image with one or more candidate images is recorded and saved in a useful reporting format.

The presently disclosed methods and systems are capable of maintaining a high degree of efficiency in building reports and accomplish report building faster, more efficiently, and more accurately than traditional methods. The methods and systems described herein are far superior in terms of ease of use and the amount of metadata and decision artifacts recorded as compared to that of the prior art as discussed herein. The systems and methods disclosed herein save time and computer resources, allowing for a greater number of fingerprints to be analyzed and reports to be built. As a result, the technique frees up more important resources that can be allocated to improve the overall process of examining fingerprints, thus significantly advancing the state of the art.

Using a system or method as described herein, the process of examining fingerprints, such as determining whether a lifted fingerprint captured from a crime scene matches a fingerprint found in a database, may be automatically integrated into a process of reporting the examination, such as for a trial. Using conventional methods, a fingerprint examiner may use one or more applications, such as an image viewer and/or an image editor, for examining a fingerprint and one or more other applications, such as Microsoft Word™ or PowerPoint™ to build a report to explain his or her examination. Fingerprint examiners using conventional methods of examination and reporting are often forced to copy and paste between applications, export files from one application and import files into another application and use their own memory to exchange data between applications.

Using a system as described herein, a fingerprint examiner may be enabled to examine a fingerprint within a single application which may be configured to automatically generate a report. In this way, the risk of the fingerprint examiner mistyping data, selecting a wrong file, or making other mistakes due to the requirement of exchanging data between applications is reduced or eliminated. Similarly, the methods and systems described herein enable fingerprint examiners to be more efficient as compared to conventional methods as fingerprint examiners are not required to switch between applications with vastly different user interfaces and workflows. The automated system of generating fingerprint examination reports as described herein provides a faster and more accurate fingerprint examination report as compared to conventional systems.

In conventional methods, to identify whether a probe fingerprint image matches a fingerprint in a gallery of represented fingerprints, a core point 101 of the probe fingerprint 100, as illustrated in FIG. 1A, may be used as a reference point. The core point 101 of a fingerprint is defined as the north-most point of the innermost ridge line.

Further, in conventional methods, to identify whether a probe fingerprint image matchers a fingerprint in a gallery of represented fingerprints, minutiae points such as bifurcations 120 and ridge endings 121, as illustrated in FIG. 1C, may be used as comparison points.

An exemplary embodiment of the present disclosure provides an automated method for generating reports comprising metadata and decision artifacts relating to a fingerprint examination. The method includes guiding a fingerprint examiner through the process of determining similarities and/or dissimilarities between a probe fingerprint image and a candidate fingerprint image. The method results in the recording of a great amount of information such that reports of a wide variety of formats can be generated.

Embodiments disclosed herein may comprise one or more customer devices, a network, one or more servers, and one or more databases. An overview of an embodiment of the system is illustrated in FIG. 1B.

In particular, a user, such as a fingerprint examiner, of a client device 104 may operate and utilize the device 104 to enter a biometric sample and/or supplementary data, as discussed below. The client device 104 may be in communication with a network 105 or directly in communication with a server 111 and an external storage device 103 via a communications link 102. Functions involved with performing steps of the embodiment may be performed within the server 111. Alternatively, the steps required for an embodiment of the system may be performed entirely within the user device 104.

An example environment comprising a server performing the steps of the system is illustrated in FIG. 1B. Server processor 107 may comprise one or more microprocessors, controllers, or other computing devices or resources interconnected via one or more communication links. The processor may operate alone or in conjunction with other components or additional processor(s) of the system described herein.

Processor 107 may be communicatively coupled to memory 110 via an internal link 106. Memory 110 may take the form of volatile or non-volatile memory including, but not limited to, magnetic media, optical media, random access memory (RAM), read-only memory (ROM), removable media, or any other type of memory component. In some embodiments, memory 110 may be internal or external to the processor 107 and may include instructions to perform the steps of embodiments of the system. In some embodiments the server may further comprise a transmitter/receiver 109 used to communicate with external device, i.e. a client device 104, an external storage device 103 and/or a network 105 as well as an internal storage device 108.

The transmitter/receiver 109 may include any necessary hardware and/or software for sending data signals, control signals, etc. to and from external components and the processor 107. Example embodiments contemplate that the transmitter/receiver 109 may be configured as simple output/input ports or more complex transmitter/receiver circuits having drivers and other associated circuitry, such as circuitry for wireless communication. In some embodiments, the transmitter/receiver 109 are configured to transmit and receive, respectively, signals via wired communications to other elements either via a circuit trace (e.g., via a PCB), an IC trace (e.g., an electrical trace or via established in an IC chip), an external wire, or the like.

Embodiments of the present disclosure may be performed in such a system as illustrated in FIG. 1B in a number of ways. For example, a gallery of fingerprint IDs may be stored on external storage 103 and updated by a client device 104 or via the network 105. A probe fingerprint image may be input into the server 111 via the client device 104. The iterative process illustrated in FIG. 5 may be performed, for example, by the processor 107 of the server 111, or via a processor of the client device 104. Data relating to fingerprint examination may be stored temporarily in the memory 110, the storage 108, the external storage 103, or sent to the client device 104 or to a network location on the network 105. The fingerprint gallery may be updated via the network 105, the client device 104, or via the transmitter/receiver 109.

It should be understood that example embodiments are not limited to the structure of the server 111 shown in FIG. 1. For example, the server 111 may be implemented by a digital state machine comprising digital components such as logic gates. As another example, the server 111 may be implemented as an application specific integrated circuit (ASIC).

Exemplary embodiments of the present disclosure involve a gallery representing a number of fingerprint images. The gallery may be used to verify a probe fingerprint image by matching the probe fingerprint image to one of the fingerprint images represented in the gallery.

Embodiments of the disclosed system use features derived from multiple minutia points. The features do not require the accurate detection of a single reference point. Minutia points in the probe image are detected by a processor, for example, in step 406a or via manual means (examiner selected) 406b. Minutia refers to specific patterns formed by ridges of a fingerprint image. The disclosed embodiments, by using minutia patterns to filter fingerprint galleries, is robust to variation in minutia pattern between different impressions of a fingerprint and is capable of a very high search speed as compared to traditional methods.

Figure 2B:
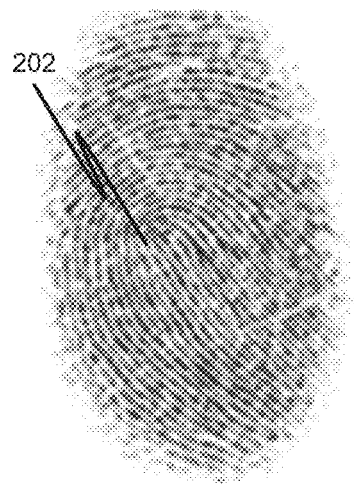
FIG. 2B is an illustration of an example fingerprint.
Figure 2C:
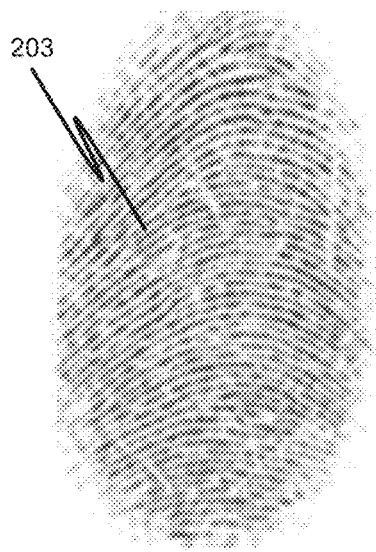
FIG. 2C is an illustration of an example fingerprint.
Figure 2D:
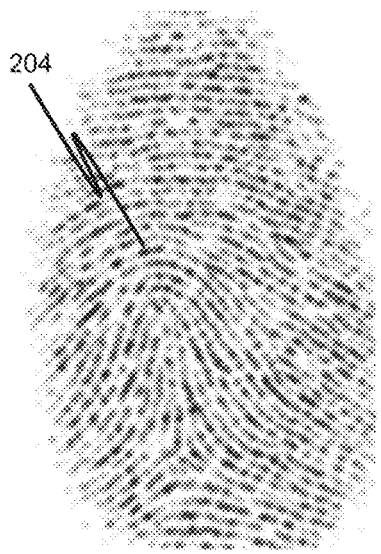
FIG. 2D is an illustration of an example fingerprint.
Figure 2E:
FIG. 2E is an illustration of an example fingerprint.
Figure 3:
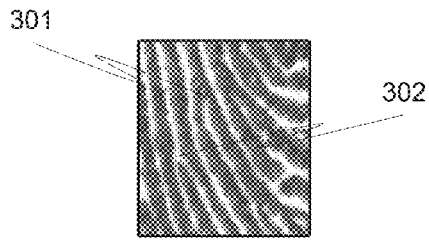
FIG. 3 is an illustration of examples of fingerprint minutia.

In FIGS. 2A-2E, five categories of fingerprint images based on ridge patterns are illustrated. In FIG. 2A, a left loop category 201 is illustrated. In FIG. 2B, a right loop category 202 is illustrated. In these categories, the fingerprints contain ridges which enter from one side, form a loop, and exit from the same side. FIG. 2C illustrates a fingerprint of the plain arch 203 category. FIG. 2D illustrates a fingerprint of the tented arch 204 category. In these categories, the fingerprints contain ridges which enter from one side, form an arch in the center and leave from the other side. Tented arches have a sharper rise and are discontinuous in the center. The whorl category is illustrated in FIG. 2E and contains ridges 205 which turn around by an entire 360 degrees. FIG. 3 illustrates an example of two types of minutia which commonly occur in fingerprints: ridge ending minutia 302 and ridge bifurcation minutia 301. Ridge ending minutia 302 is defined as the end point of a ridge, and ridge bifurcation minutia 301 is defined as a split in the ridge pattern such that two ridges join together or split apart. As discussed below, in relation to FIGS. 4-7C, fingerprints may be compared in a process of comparing one or more candidate fingerprint images with one or more probe fingerprint images. During the process of comparing, a report may be generated as described herein.

Figure 4:
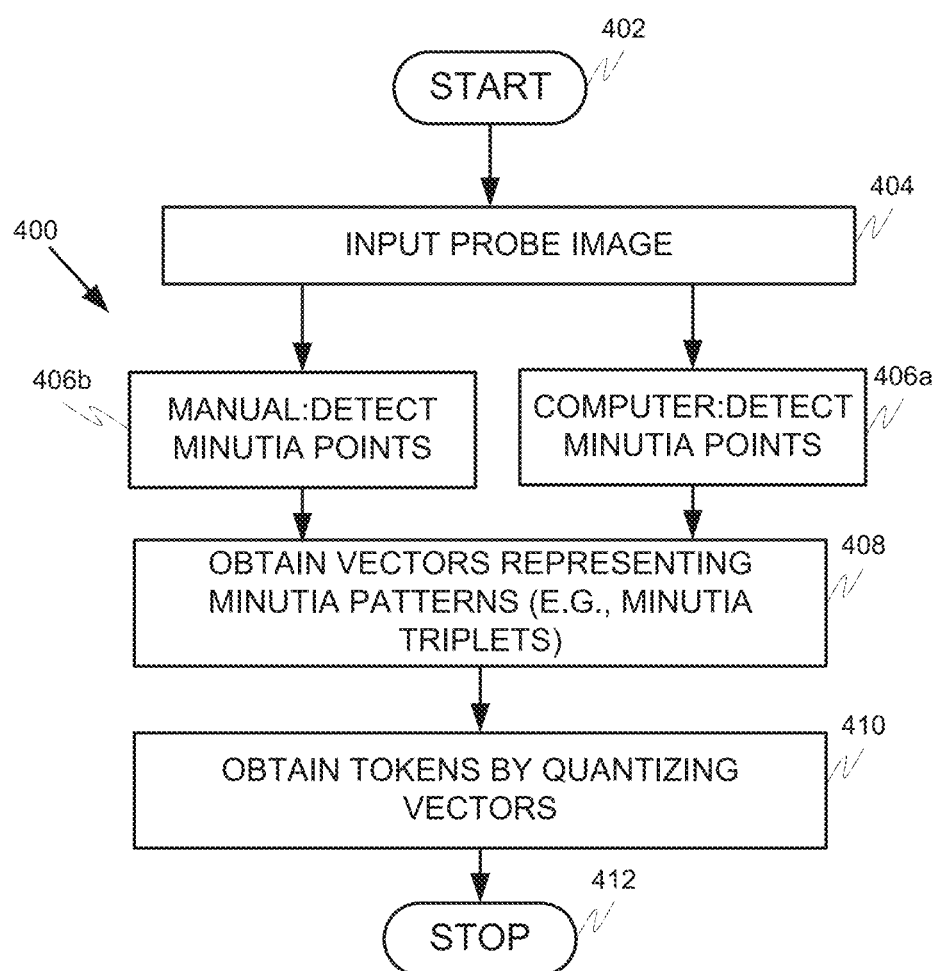
FIGS. 4 and 5 are flowcharts illustrating automated methods of reporting fingerprint data in accordance with an exemplary embodiment of the disclosure.

In FIG. 4, a flowchart of an enrollment process in which fingerprint features are extracted from fingerprint images is illustrated. Vectors may be used to represent minutia patterns in fingerprint image. The vectors are quantized to one of M quantization levels, referred to as tokens. Tokens may be used as features to describe the image. Set of all possible token values is called as token-set. The method 400 begins at step 402 and moves to step 404 where a probe image is input. Next, at step 406, the method involves detecting minutia points in the probe image. Next, at step 408, vectors representing patterns of the minutia points are generated. Finally, at step 410, tokens are obtained by quantizing the vectors representing the minutia patterns and stored. The method ends at step 412.

During a fingerprint examination, a fingerprint examiner may compare a probe fingerprint image with a candidate fingerprint image. The fingerprint examiner may be assisted in multiple ways by a software application configured to guide the fingerprint examiner through the examination process. As the fingerprint examiner works through the fingerprint examination process, the software application may collect any relevant data, such as metadata, relating to decisions made by the fingerprint examiner during the examination process.

As an example, one way software application may assist a fingerprint examiner during a fingerprint examination process is to align a candidate fingerprint image with a probe fingerprint image. To align a candidate fingerprint image with a probe fingerprint image, a software application may match one or more points of minutiae in the candidate fingerprint image with one or more points of minutiae in a probe fingerprint image. Such points of minutiae in the candidate and probe fingerprint image may be automatically detected, located, and/or determined by the software application, or may be manually selected by the fingerprint examiner or another user.

Because fingerprints are generally found on flat surfaces, fingerprint image data is not typically as variable as, for example, facial image data. Although material used to collect fingerprints may be capable of stretching or otherwise being manipulated, fingerprint image data typically matches other fingerprint image data taken from the same source finger. For this reason, any minutiae found in a fingerprint image may be used as a landmark in the fingerprint alignment process. Two fingerprint images with one or more points of minutiae in common may be rotated, resized, cropped, etc. and overlaid and blended together to form a blended fingerprint image. A blended fingerprint image allows a fingerprint examiner to quickly assess whether any points of reference or minutiae exists in common between the probe and candidate fingerprint image. In this way, the software application may track anything a fingerprint examiner does during an examination process and build a report, while at the same time aligning and blending fingerprint image data, and tracking annotations made by fingerprint examiners. The primary benefit of this process is the reduction of fatigue on the examiner as all imagery and actions are presented and executed in a common reference frame.

In contrast to conventional methods of fingerprint examination, in which fingerprint examiners use an external application for taking snapshots or screenshots of fingerprint image data, a second external application for writing annotations, and other external applications for other tasks required in a fingerprint examination, the present disclosure enables fingerprint examiners to use a single fingerprint examination software to analyze two fingerprint images and build a report capable of being admitted into court as evidence.

The software application may enable fingerprint examiners to manually zoom in and realign fingerprint image data or may automatically zoom in and realign fingerprint image data based on multiple points of minutia. This software application may contain sliders for assisting with adjustments to contrast, brightness, etc. Further, the software application may track any editing of a fingerprint image data such as zooming, aligning, rotation, brightness, contrast, etc. and such information may be captured for each instance in which a fingerprint examiner has found minutiae existing in common or dis similarities between two fingerprint images.

Figure 5:
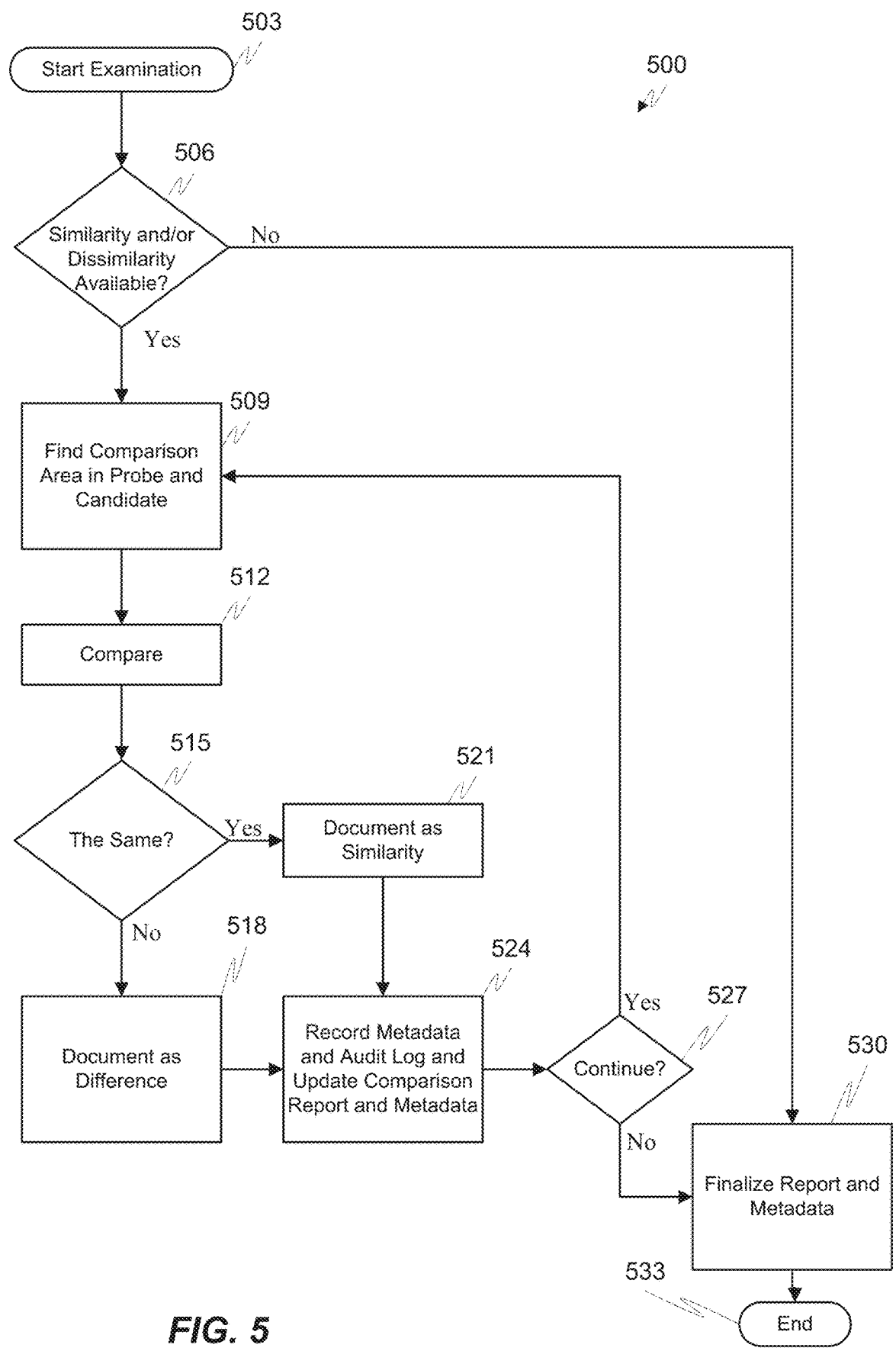

As illustrated in FIG. 5, a method 500 for generating automated, courtroom-ready reporting of the means, methods, and decisions leading to an identification or non-identification decision by a fingerprint examiner is illustrated. In some embodiments, the method 500 may be implemented using a computer system for example as illustrated in FIG. 1B. At the beginning of the method 500, a computer system may be operated by, for example, a fingerprint examiner in the process of analyzing a probe fingerprint image in step 503. Analyzing a probe fingerprint image may consist of the fingerprint examiner performing a fingerprint comparison between the probe fingerprint image and one or more fingerprint images in a gallery of fingerprint images.

During a fingerprint comparison, the fingerprint examiner may determine whether minutiae points of similarity or dissimilarity between a probe fingerprint image and fingerprint images of a gallery of fingerprint images can be located and/or are available in step 506. If minutiae points of similarity and/or dissimilarity are located in step 506, the fingerprint examiner may next find a comparison area in the probe fingerprint image and a candidate image in step 509. If, on the other hand, minutiae points of similarity and/or dissimilarity are not available in step 506, the fingerprint examiner may simply use a reporting tool in the form of software executing on a computer system to finalize a report and any metadata relating to the decision in step 530.

In step 509, the fingerprint examiner may next find a comparison area in the probe fingerprint image and a candidate image. Using the reporting tool, the fingerprint examiner may compare the comparison areas in the probe fingerprint image and the candidate image in step 512. In step 515, the fingerprint examiner may determine whether the comparison areas in the probe fingerprint image and the candidate image are the same. If the comparison areas in the probe fingerprint image and the candidate image are the same, the process moves to step 521 in which the fingerprint examiner may document the comparison areas in the probe fingerprint image and the candidate image as a point of similarity. On the other hand, if the comparison areas in the probe fingerprint image and the candidate image are not the same, the process moves to step 524 in which the fingerprint examiner may document the comparison areas in the probe fingerprint image and the candidate image as a point of difference.

Following either of steps 518 or 521, the method 500 may continue to step 524 in which the reporting tool may record metadata and update a log in which all steps performed by the fingerprint examiner are recorded. The log may be continuously or periodically audited. The reporting tool may build a comparison report and a metadata file. With each compared area between a probe and a candidate, the comparison report and the metadata may be updated.

In this way, the reporting tool may capture and document the similarity and/or differences between the probe fingerprint image and the fingerprint image of the gallery with which the probe fingerprint image was compared. After the fingerprint examiner has documented the similarity or difference between the comparison area and the metadata, log, and comparison report have been updated, a decision 527 may be made as to whether the process should continue.

The decision 527 as to whether the process should continue may be made manually by a fingerprint examiner or automatically based on a determination by a computer as to whether a threshold amount of data has been recorded and logged. For example, when a fingerprint examiner has documented a similarity and/or dissimilarity, the fingerprint examiner may continue to search for a new feature to repeat the process by returning to step 509. When the fingerprint examiner has determined a sufficient number of points has been documented, the fingerprint examiner may make their final decision on the comparison and mark it as an identification or no-identification (hit/no-hit) and save/finalize the process in step 530.

Upon the process being finalized, a report may be generated by the reporting tool. The report may contain or may be accompanied with supporting metadata. The metadata may include probe information (capture date, capture method, personnel responsible for capturing the probe) and candidate information (name, date of birth, place of birth, height, weight, eye color, hair color, facial image/mugshot, image capture date, image capture methodology), and comparison information (number and type of minutiae within the comparison areas, ridge counts between the neighboring minutiae, comparable third-level detail within the comparison area). The metadata may be used for additional examiner verification and/or courtroom presentation. Following step 530, the method 500 may end at step 533.

Figure 6A:
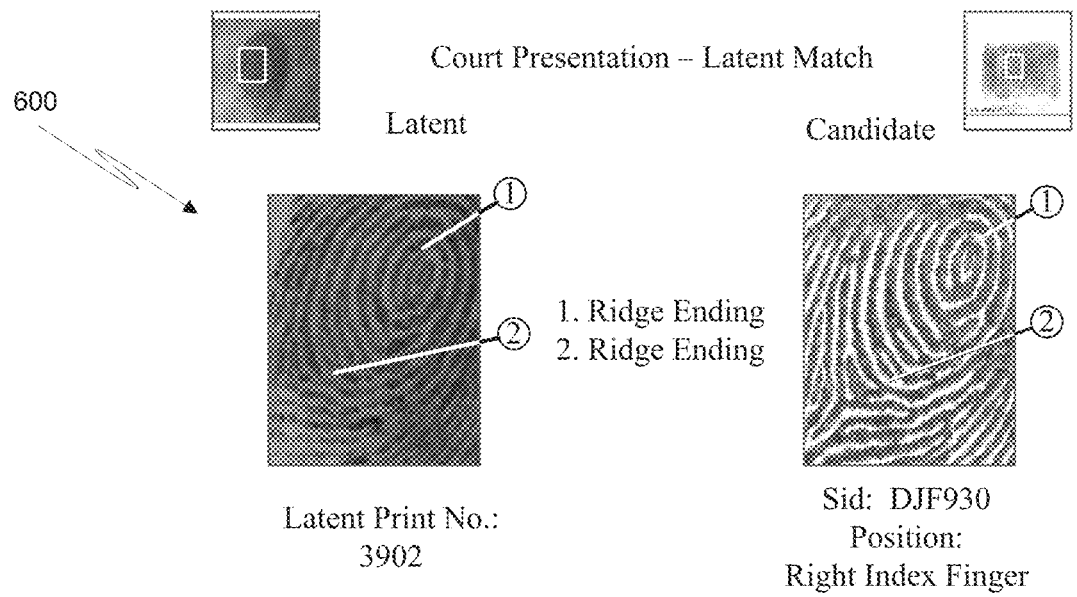
FIG. 6A is an illustration of a report in accordance with one or more embodiments of the present disclosure.

As illustrated in FIG. 6A, data collected during the process of comparing a probe or latent fingerprint image with a candidate fingerprint image may be included in a printable court presentation image 600. A printable court presentation image may comprise a zoomed-in and cropped portion of one or both of the candidate and probe fingerprint images. Markers may be added manually or automatically and may be used to label any similarities and/or dissimilarities found by a fingerprint examiner during the examination process. For example, if an examiner finds two ridge endings which match between a probe and a candidate image, the reporting process may comprise generating closeup images of an area of each of the fingerprint images containing the two ridge endings which match. Markers may be added manually or automatically to show where each of the two ridge endings, or other similarity or dissimilarity, are in each of the images.

Figure 6B:
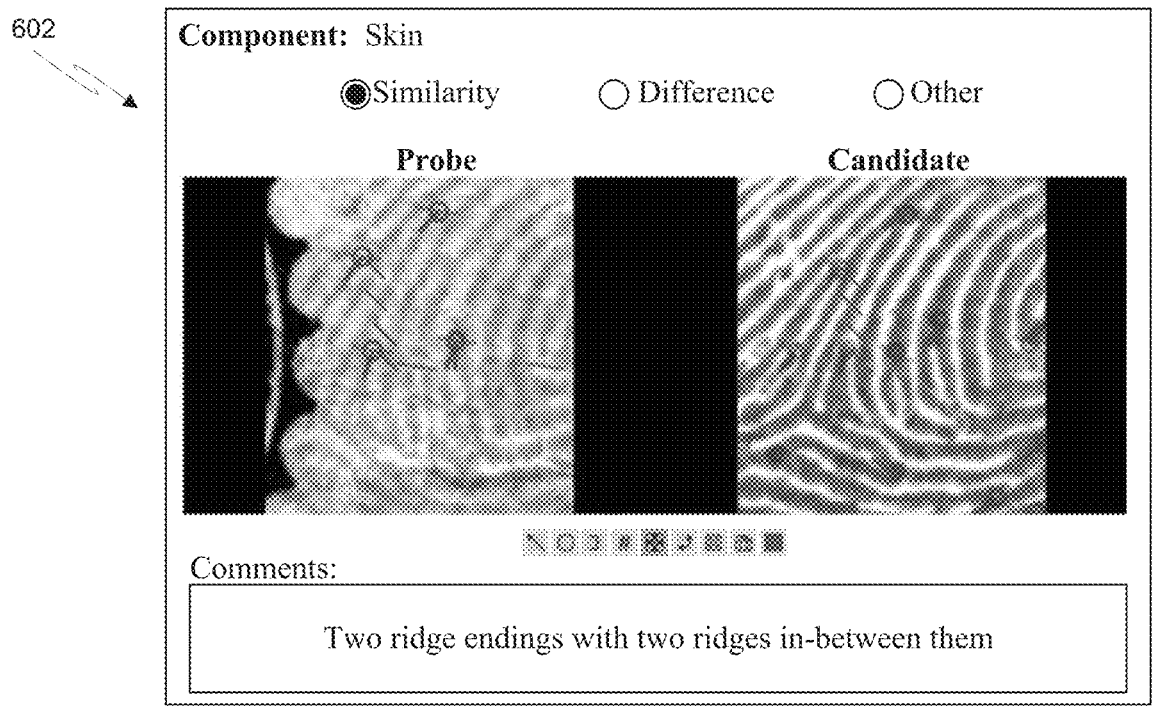
FIG. 6B is an illustration of a user interface in accordance with one or more embodiments of the disclosure.

Similarities, dissimilarities, or other information may be logged manually by a fingerprint examiner using a user interface such as that illustrated in FIG. 6B. As illustrated in FIG. 6B, a user interface 602 may include a text box in which an examiner may insert a description of the labeled similarities and/or dissimilarities. The user interface may also include a number of graphical user interface elements which may enable the examiner to add markers and/or other types of labels such as lines, arrows, circles, etc. to one or both of the probe and candidate fingerprint image. Any information entered by an examiner using such a user interface may be used by the computer system during the process of generating the report. For example, any information entered by the examiner in the user interface 602 of FIG. 6B may be displayed in an image of a report 600 as illustrated in FIG. 6A.

In this way, unique areas of a probe fingerprint image may be documented. A user interface 602 such as that illustrated in FIG. 6B may include a number of tools, such as a magnifying glass, an area capture tool, etc. For example, a fingerprint examiner may be enabled to zoom in on a view of each of the probe and candidate fingerprint images such that the portion of each of the probe and candidate fingerprint images shown in the view remain of the same portion in each image.

User interfaces included in the examination process software may include fields such as text boxes, checkboxes, or other data entry fields. Data entered into user interfaces may be used in the generation of reports. In some embodiments, fields may be autocompleted based on information entered into other fields during the examination.

During the process of comparing a candidate fingerprint image with a probe image, an examiner may be presented with a user interface showing each of the candidate and probe images. The examiner may be enabled to, using a system as described herein, edit both the candidate and probe images simultaneously. A blended image formed by a blend of the candidate fingerprint image with the probe image may be automatically created.

Figure 7A:
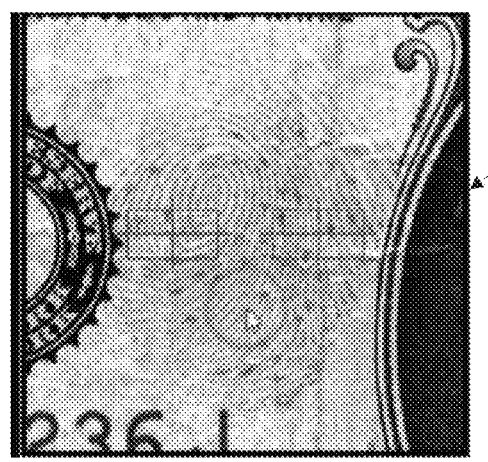
FIG. 7A is an illustration of a user interface showing a probe fingerprint sample in accordance with one or more embodiments of the present disclosure.
Figure 7B:
FIG. 7B is an illustration of a user interface showing a candidate fingerprint sample in accordance with one or more embodiments of the present disclosure.

For example, a candidate fingerprint image 700 as illustrated in FIG. 7A may be studied by a fingerprint examiner during the process of comparing the candidate image with a probe image 702 as illustrated in FIG. 7B. The examiner may use a computer to draw or insert markers on one or both of the candidate and probe images. The computer may be capable of automatically aligning the candidate and probe images with one or more points of reference. For example, a center of the fingerprint in the candidate image may be located and a center of the fingerprint in the probe image may be located. The centers of each of the images may be used to align the fingerprint images.

In some embodiments, multiple reference points may be used to align the images. For example, fingerprint images are generally found on flat surfaces. While surfaces containing fingerprint images may be capable of stretching or otherwise becoming misshapen, fingerprint images are not likely to become drastically out of shape. Software may provide ways to reduce variability of fingerprint images in multiple positions and to realign a stretched fingerprint image to match a second image of the same fingerprint which has not been stretched or otherwise misshapen.

Markers inserted or drawn onto one of the images may automatically appear in the other image. For example, when a fingerprint examiner has located a point of interest in one of the fingerprint images, the fingerprint examiner may add a marker, text, or other GUI indicator to a point in one of the images. The computer system may identify a point in the other of the images matching the point marked by the examiner in which the point in the other images matches the point marked based on one or more reference points common between the two images.

Figure 7C:
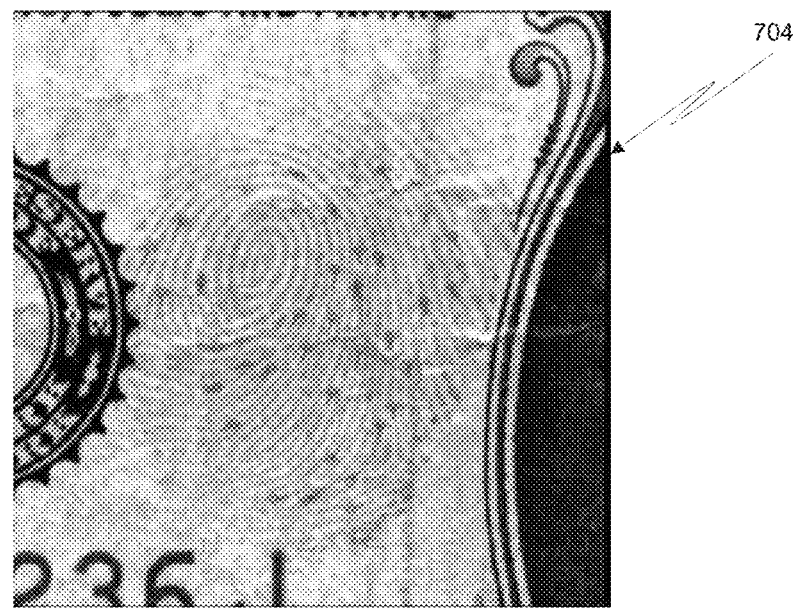
FIG. 7C is an illustration of a user interface showing a probe fingerprint sample blended with a candidate fingerprint sample.

In some embodiments, a blended image 704 as illustrated in FIG. 7C may be generated by the computer system. The blended image may be formed as a combination of a candidate image and a probe image. For example, the candidate image 700 of FIG. 7A may be combined with the probe image 702 of FIG. 7B to generate the blended image 704 of FIG. 7C. A blended image may be formed by overlaying one image with another image, rotating one image to match a rotation of the other image based on one or more reference points automatically or manually placed on the probe and candidate images that are in common between the images. In some embodiments, one image may be modified in other ways such as being flipped, stretched, inverted, etc. such that the reference points in common between the images are in alignment.

The annotated candidate image, probe image, and/or blended image may be used in the generation of an examination report. A fingerprint examination report may comprise a plurality of fields containing a variety of information gathered during the examination of a fingerprint by an examiner using a computer system as described herein. A fingerprint examination report may be in the form of a Word™, PDF, HTML, or other type of document. For example, a fingerprint examination report may be a multi-page PDF document containing data relating to a particular fingerprint examination formatted for presentation in a court proceeding.

In some embodiments an examination report may comprise an agency summary describing information relating to the generation of the report and the substance of the examination. For example, an agency summary may comprise information such as an identity of the examiner, an identity of the computer system used during the examination, and information relating to the location of the examination.

A fingerprint examination report may further comprise a case summary. A case summary may comprise a title of the case, a number of the case, an examination type, a date of the examination, an identifier of the probe used during the examination, a listing and/or number of a total number of candidates returned. A fingerprint examination report may further comprise an indication as to a file location address where the report is being stored, such as a computer network location.

A fingerprint examination report may further comprise a listing of certain report information such as an identifier of the application of the computer application used during their port such as a version number, a date of the report, a list of the total number of pages of the report.

A fingerprint examination report may comprise details on the source of one or more of the candidate image and the probe image used during the examination. For example, lift details may be included describing the source of one or more of the candidate image and the probe image used during the examination. Lift details may comprise a location of a lifted fingerprint, a date of the lift, a method used for the lift, and or other information. Lift information may further comprise an image of the lift from which the one or more of the candidate image in the probe image was obtained. The image of the lift from which the one or more of the candidate image and the probe image may be edited to indicate which portion of the lift image was used during the examination. Coordinates of the portion of the lift image used during the examination may likewise be included in the information in the report.

A fingerprint examination report may also include candidate list information such as biographic information and/or demographic information relating to a source of a candidate image data. For example, candidate list information may include a name of the candidate, a date of birth of the candidate, an identification number of the candidate, height, weight, eyes, hair, color, gender, race, etc.

In some embodiments a fingerprint examination report may include a candidate facial image collected during the initial enrollment of the candidate into the system.

In some embodiments a fingerprint examination report may include a candidate ten-print card used during the collection of the data images used to obtain the candidate images. A ten-print card may include a number of fingerprint images, one of which may have been used as the candidate image during the examination.

A fingerprint examination report may include details on a comparison between the probe image and the candidate image. For example, side by side images of the candidate and the probe image may be included. The side-by-side images of the candidate and the probe image may include markings added by a fingerprint examiner during the examination process. Certain sections may be highlighted to indicate areas containing points of interest. Annotation data such as arrows or other indicators may be included, and a listing may be included to show more information relating to one or more of the annotation data points. For example, a number of markers may be inserted on both the probe image and the candidate image. Each of the markers may be associated with the number. Each number may be listed in a table which may identify more information relating to each marker. For example, the table may include a description of the type of minutiae indicated by each marker and a coordinate of each marker.

A fingerprint examination report may also include a comparison summary listing overall notes included by the examiner describing the substance of the report and any conclusions of the examination. Any data included in the examination report maybe automatically collected by the computer system during the examination of the fingerprints.

Figure 8A:
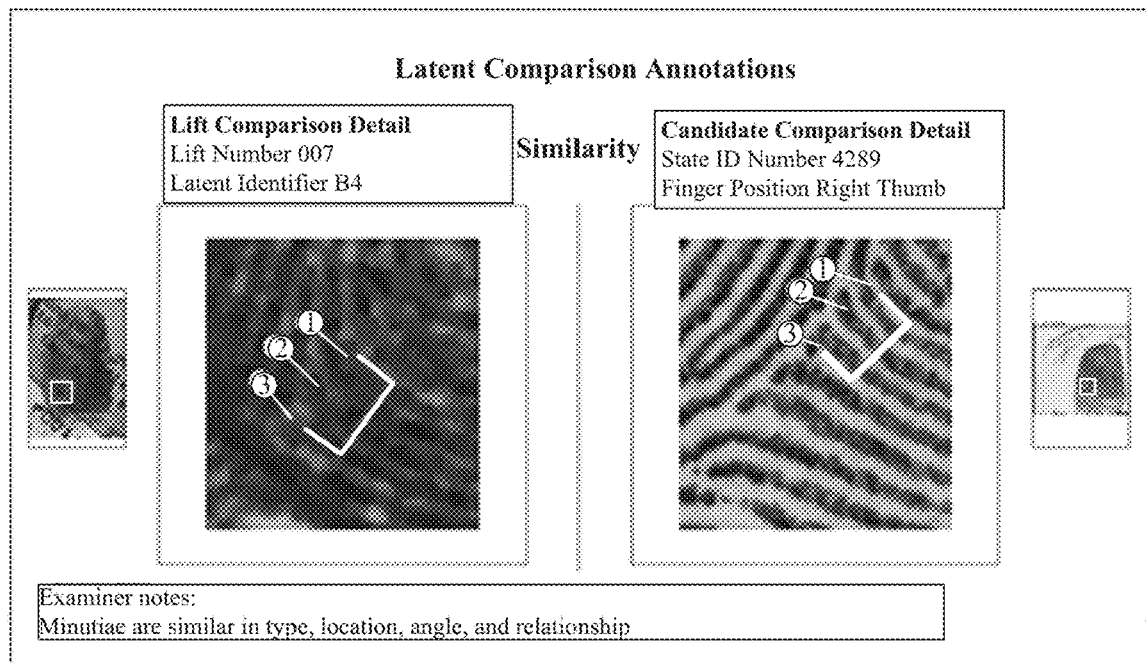
FIGS. 8A and 8B are illustrations of portions of reports in accordance with one or more embodiments of the present disclosure.

For example, as illustrated in FIG. 8A, a report may include a display 800 of latent comparison annotations created by a fingerprint examiner during examination. As an examiner reviews a first fingerprint image and compares the first fingerprint image to a candidate fingerprint image, the examiner may be enabled by the examination application to annotate each image alone or in combination with another. The examiner may be enabled to add notes, draw lines and boxes, etc. to show his or her findings. When a report is generated, the report may include a display such as that illustrated in FIG. 8A.

A latent comparison annotations report may in some embodiments include details of a lifted fingerprint. For example, the latent comparison annotations report may include a lift number for the lifted fingerprint, a latent identifier, or other information which may be helpful for the report. The latent comparison annotations report may also include a zoomed-in image created by the examiner during examination alongside a copy of the original fingerprint with a box highlighting the portion from which the zoomed-in image was taken.

Similarly, the latent comparison annotations report may include details of a candidate fingerprint. For example, the latent comparison annotations report may include a state ID number, a finger position, or other information which may be helpful for the report. The latent comparison annotations report may include a zoomed-in image of the candidate fingerprint created by the examiner during examination alongside a copy of the original candidate fingerprint with a box highlighting the portion from which the zoomed-in image of the candidate fingerprint was taken.

The latent comparison annotations report may include an indication as to whether the annotations relating to the lifted and candidate fingerprints are considered a similarity, dissimilarity, or other. For example, as described above in relation to FIG. 6B, an examiner may be enabled to select between such options during examination. Any notes entered by the examiner for the comparison may also be included in the form of a text box or other user-friendly visual manner.

Figure 8B:
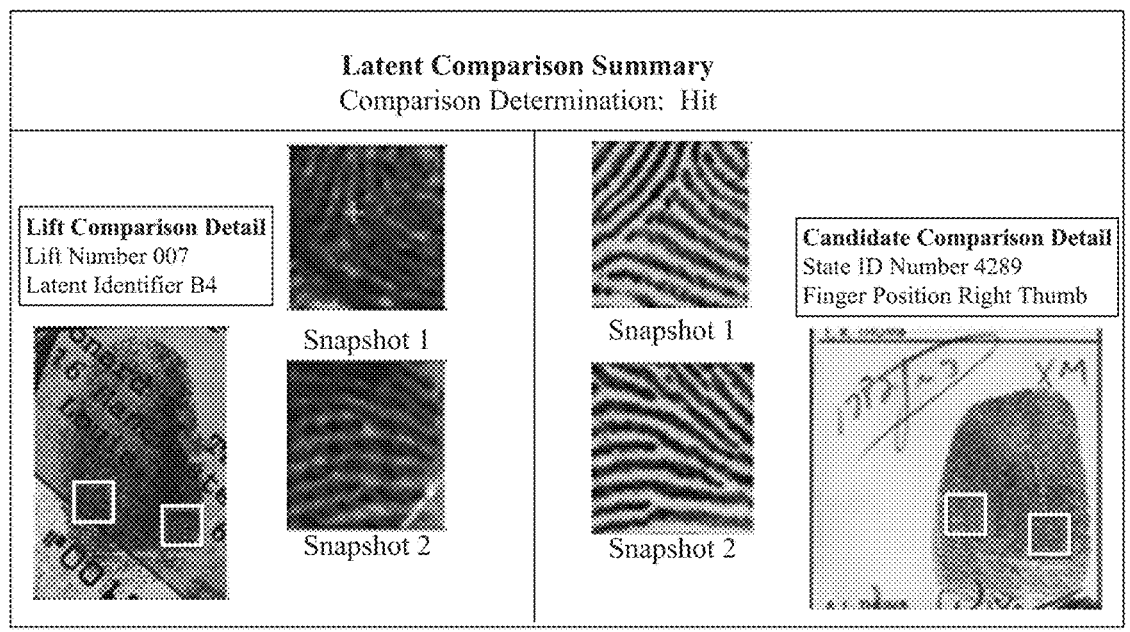

As illustrated in FIG. 8B, a report may include a display of a latent comparison summary 802. Such a summary may be presented after presenting the individual comparison results such as that illustrated above in relation to FIG. 8A. In some embodiments, an examiner may be enabled to select, during examination, which comparisons should be listed in a summary page. For example, the examiner may find particular comparisons to be most convincing. The examiner may then select an option to include that particular comparison in the summary page.

A latent comparison summary 802 may in some embodiments include an overall determination regarding the comparison of the lifted fingerprint and a candidate fingerprint. For example, the summary page 802 may indicate whether the candidate image is a hit or match or whether the candidate image is not a hit or match.

The latent comparison summary 802 may include details identifying the lifted fingerprint as well as the candidate fingerprint being compared to the lifted fingerprint. The latent comparison summary 802 may also include one or more snapshots taken from each of the candidate and lifted fingerprints alongside the overall images of each of the candidate and lifted fingerprints with boxes highlighting the portions from which the snapshots were taken.

The latent comparison summary 802 may include any information which may be helpful for presentation during a trial to show whether the fingerprints are a match or are not a match. The information presented in the latent comparison summary 802 may be generated in the report automatically—saving the examiner the time and effort involved in building the report manually using a number of separate computer applications. By enabling an examiner to build a report automatically, by simply performing an examination and clicking an export button, the methods and systems described herein improve the efficiency of examiners, reduce the risk of examiner mistyping information or making errors when using multiple applications.

Typically, for a fingerprint examiner to include a zoomed in snapshot from an image, the examiner must save a screenshot of the two full fingerprints side-by-side with the boxes drawn. The examiner must include a description of the case, a description of the candidate fingerprint, a description of the input image, and then a copy of the zoomed in area of the box. The systems and methods described herein enable each of these steps to be automated. Conventional methods of creating such images and editing the images for clarity and adding annotations requires using a number of different computer applications, such as Photoshop, Adobe Acrobat, Microsoft Word, etc. Moving between each application requires a great deal of time and mental effort. Furthermore, working with multiple files and applications increases the likelihood of risks. For example, typographical errors, selecting wrong files, mistyping filenames, etc. In particular, when an examiner is working with a large number of input or latent fingerprint images and candidate fingerprint images, the systems and methods described herein eliminate the possibility of an examiner including incorrect fingerprint images. The systems and methods describe herein enable steps to be performed automatically.

In some embodiments, a page of a fingerprint examination report may include a report information section, an agency summary section, a case summary section, and a search summary section. A report information section may include information such as an identification of any software used to generate the report, a date and/or time the report was generated, a total number of pages of the report, a filename or file location of the report, and/or other information which may be associated with the creation of the report.

An agency summary section may include information identifying the agency having prepared the report. For example, the agency summary section may include a name or identity of a workstation used to prepare the report, a username of the user having prepared the report, username of an examiner that verified the report, an identity of the agency, a source of the agency, a controlling agency identifier, a transaction control number (TCN), a device ID, an operator ID, an agency location, an agency name, a transaction control record (TCR), and/or other information.

A case summary section may include a case title, a case number, a date and/or time the examination was performed, a category of an offense associated with the examination, a latent case number extension, an indication of the type of examination performed, and/or other information. A search summary section may include review priority information, a maximum number of candidates requested, a total number of candidates returned, and/or other information.

In some embodiments, a page of a fingerprint examination report may include a case information summary. A case information summary may include a section relating to case information, such as a case title, a case date and/or time, a reason the fingerprinting was created, a date of an offense associated with the case, an agency ORI identifier, a case number, case notes, a category of the offense, a location of the agency, and/or other information. An examination summary section may include an examination type, an examination date, contact information, an examination location, an examiner name, and/or other information. A lift information summary may include information such as a number of lifts, an identifier of the lift, and one or more latent identifiers. Each latent identifier may also be listed with a location and/or ABIS of the latent identifier.

In some embodiments, a page of a fingerprint examination report may include a page including lift information. A lift information page may include an image of a lifted fingerprint along with information such as a lift identifier, a lift location, a lift photo number, a developed date, an identifier of the person having developed the lift image, an examination date, a method used for the lift, an impression type, an indication of the illumination source or lighting type, a method used to capture the lift, a serial number for the lift, an indication of any scaling used to create the lift image, an identifier of a device used to capture the lift image, and/or other information.

In some embodiments, a page of a fingerprint examination report may include a latent information page. A latent information page may in some embodiments, include an image of a lifted fingerprint along with information such as a lift identifier, a lift image filename, boxes on the lifted fingerprint highlighting portions of fingerprints, a listing of latent identifiers associated with the lift, and coordinates of the latent within the lifted fingerprint. The latent information page may also include a list of potential candidates associated with the list along with information such as a candidate identifier number, ABIS, an indication whether the candidate is a positive ID, and/or other information.

In some embodiments, a page of a fingerprint examination report may include candidate list information such as including a photo of the candidate, a total number of candidates, a number of the candidate, a name of the candidate, a social security number of the candidate, an identifier of the candidate, a date of birth of the candidate, a height, weight, eye color, hair color, gender, race, and/or other information relating to the candidate.

Example illustrations of a variety of portions of potential examination reports which may be generated in conjunction with the above-described systems and methods are illustrated in FIGS. 9A-9H.

Figure 9A:
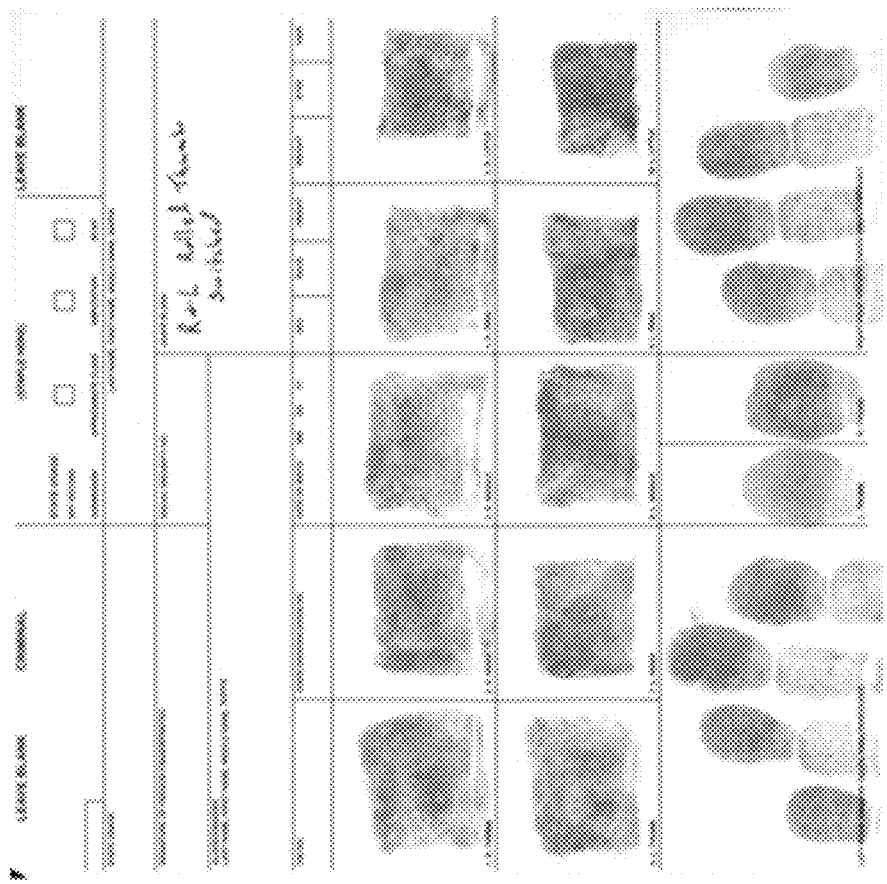
FIGS. 9A-9H are illustrations of portions of reports in accordance with one or more embodiments of the present disclosure.
Figure 9B:
Figure 9C:
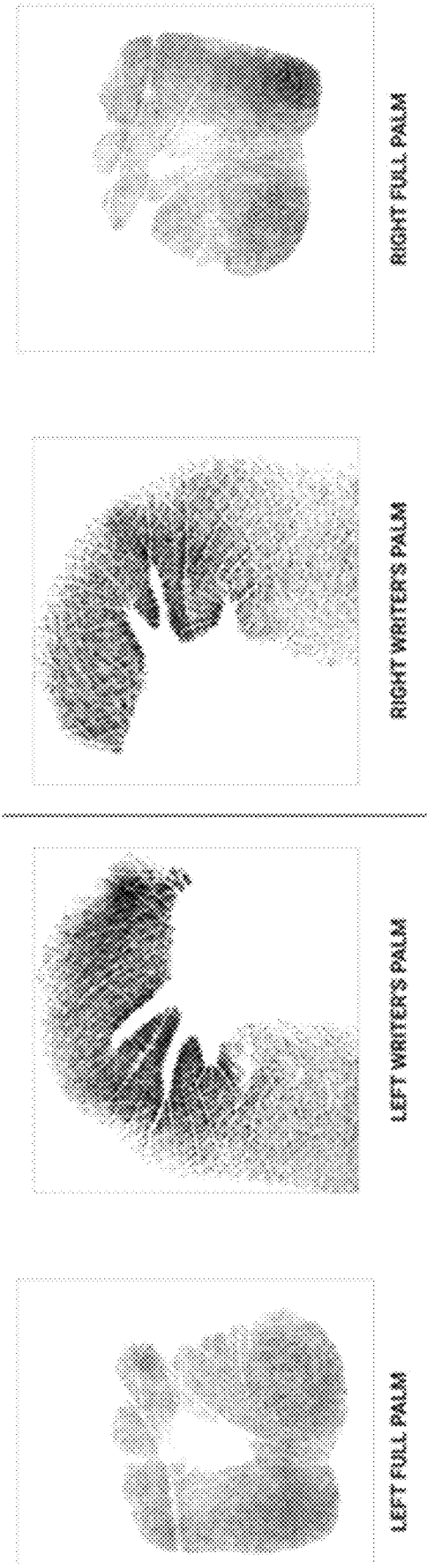

As illustrated in FIG. 9A, a page of a fingerprint examination report may include candidate list information along with a copy of a ten-print card and information relating to the ten-print card. As illustrated in FIG. 9B, a page of a fingerprint examination report may include candidate list information along with a copy of a fingerprint and information relating to the fingerprint. As illustrated in FIG. 9C, a page of a fingerprint examination report may include candidate list information along with images of palm prints and information relating to the candidate palm prints.

Figure 9D:
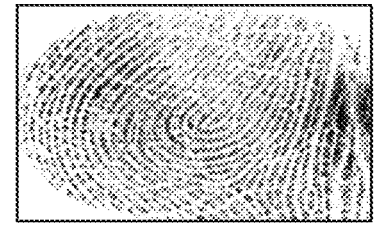
Figure 9D:
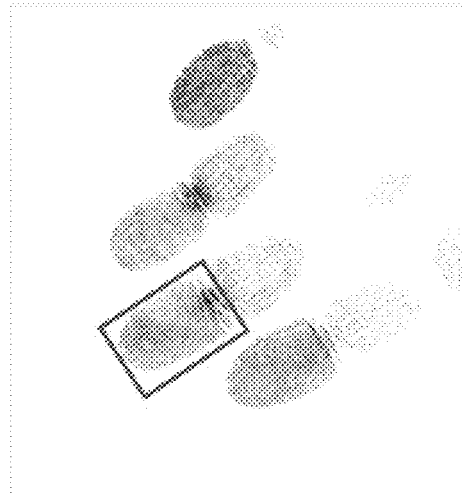

As illustrated in FIG. 9D, a page of a fingerprint examination report may include a page showing a lift region of interest. A lift region of interest page may in some embodiments include a copy of an image of a lift with a copy of a zoomed-in image taken from the image of the lift. For example, during examination, an examiner may select a fingerprint from a lift. The fingerprint may be shown on a page such as that illustrated in FIG. 9D. A box may be included in the image of the lift indicating where in the lift image the image of the fingerprint was taken. A lift region of interest page may include details such as an identifier of the lift, a filename of the lift image, an identifier of the latent, coordinates within the lift image from which the latent fingerprint was taken, and/or other information.

Figure 9E:
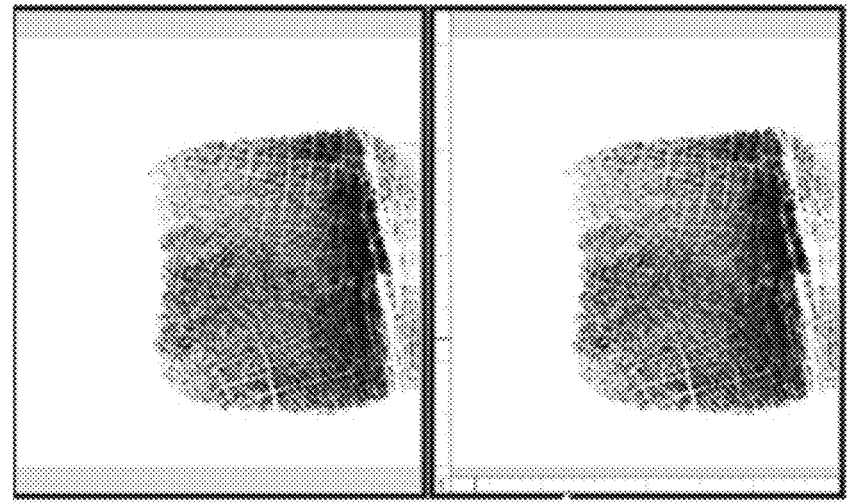
Figure 9E:

As illustrated in FIG. 9E, a page of a fingerprint examination report may include a latent comparison detail page. A latent comparison detail page may in some embodiments include images of a fingerprint from a lift alongside images of a candidate fingerprint which was compared to the lifted fingerprint during examination. Annotations such as markers identifying minutia in both the lifted and candidate fingerprints may also be presented. A latent comparison detail page may in some embodiments include details of the lift and the candidate, such as a lift identifier, a latent identifier, a TCN of the candidate, and a finger position of the candidate fingerprint.

Figure 9F:
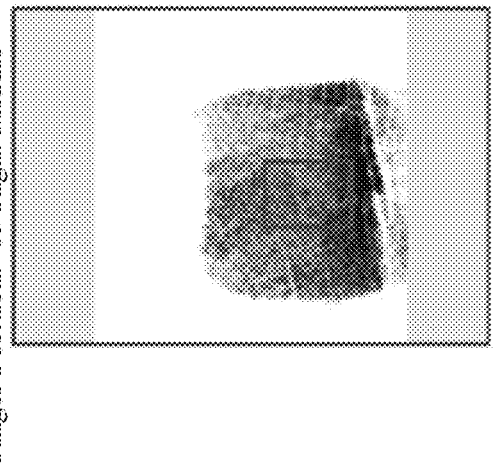
Figure 9F:
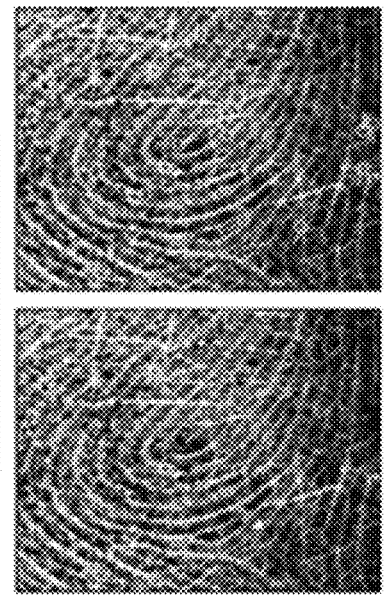
Figure 9F:
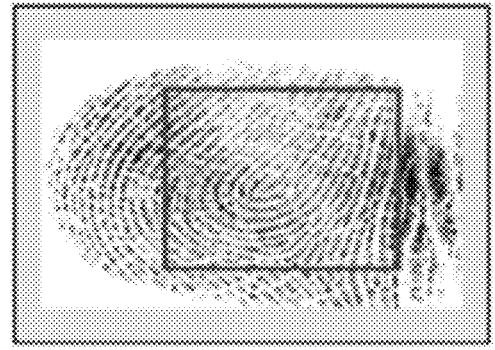
Figure 9F:
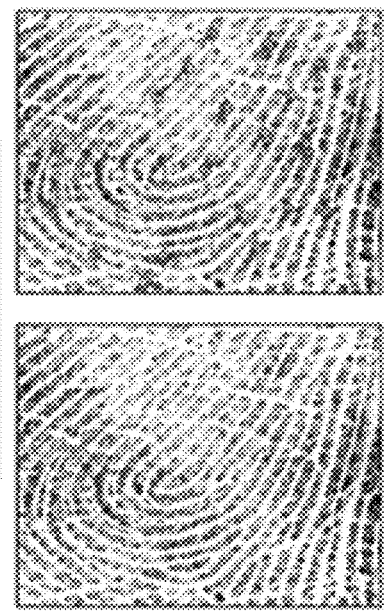

Similarly, as illustrated in FIG. 9F, a latent comparison detail page of a fingerprint examination report may in some embodiments include zoomed-in images from a lift and/or a candidate fingerprint image. A box may be displayed on a full view image of the lift and/or candidate fingerprint image showing where the zoomed-in image was taken. As should be appreciated, during examination, an examiner may capture and annotate zoomed-in images. The application used for the examination may be configured to automatically capture information such as a location of the full fingerprint image from which the zoomed in image was taken. Such information may be presented in a report as illustrated in FIG. 9F.

Figure 9G:
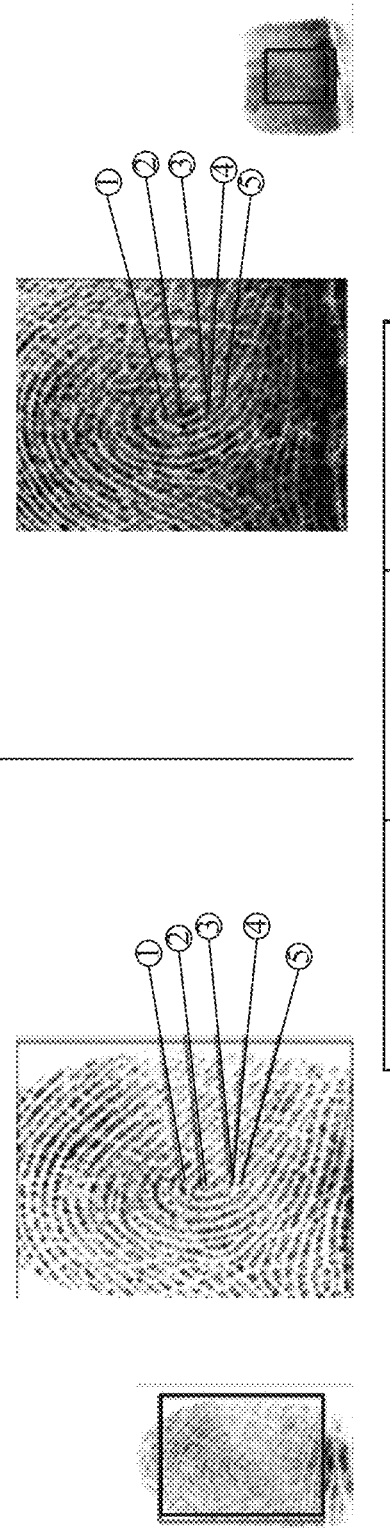

As illustrated in FIG. 9G, a page of a fingerprint examination report may include a latent comparison annotations page. A latent comparison annotations page may in some embodiments include a zoomed-in image of a lifted fingerprint alongside a full image of the lifted fingerprint. The full image of the lifted fingerprint may include a box highlighted the portion of the lifted fingerprint from which the zoomed-in image was captured. The latent comparison annotations page may also include a zoomed-in image of a candidate fingerprint alongside a full image of the candidate fingerprint. The full image of the candidate fingerprint may include a box highlighted the portion of the candidate fingerprint from which the zoomed-in image was captured. The latent comparison annotations page may also include details of the lifted fingerprint and the candidate fingerprint. The zoomed-in images may include annotations such as numbered markers pointing towards minutiae on each fingerprint. Minutia may be labeled based on type, coordinates, notes, or other information in a table on the page. The latent comparison annotations page may also include any notes input by the examiner during examination.

Figure 9H:
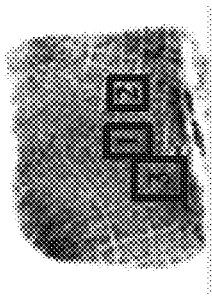
Figure 9H:
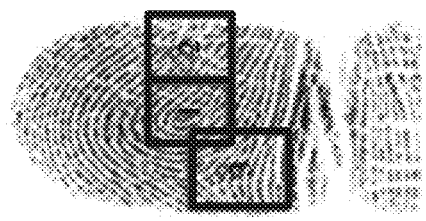

As illustrated in FIG. 9H, a page of a fingerprint examination report may include a latent comparison summary page. A latent comparison summary page may in some embodiments include an image of a lifted fingerprint and an image of a candidate fingerprint. Snapshots taken from each fingerprint may also be displayed. Boxes may be printed onto the images of the lifted and candidate fingerprints indicating from which portions of the fingerprints the snapshots were captured.

It should be appreciated that the above-described illustrations found in FIGS. 9A-9H should not be seen as being limited to any particular format or filetype. For example, an examination report may be a single document not delineated by pages or may be a multi-page document. An examination report may be a PowerPoint™, Word™, PDF, or other type of document. An examination report may be a digital file or a printed document. In some embodiments, an examination report may be a user interface displayed on a computer device. Furthermore, an examination report may contain any of the above-described contents in any layout or order. As described herein, the reporting tool in some embodiments provides seamless inclusion of associated decision metadata and automates the process of logging the similarities and dissimilarities which may be audited at a later time.

For purposes of explanation, numerous details are set forth in order to provide a thorough understanding of the present embodiments. It should be appreciated however that the techniques herein may be practiced in a variety of ways beyond the specific details set forth herein. Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices or collocated on a particular node/element(s) of a distributed network, such as a telecommunications network/bioinformatics network.

As will be appreciated from the following description, and for reasons of computational efficiency, the components of the system can be arranged at any location within a distributed network without affecting the operation of the system. Similarly, one or more functional portions of the system could be distributed between a fingerprint device(s) and an associated computing device.

While the above-described flowcharts have been discussed in relation to a particular sequence of events, it should be appreciated that changes to this sequence can occur without materially effecting the operation of the embodiment(s). Additionally, the exemplary techniques illustrated herein are not limited to the specifically illustrated embodiments but can also be utilized with the other exemplary embodiments and each described feature is individually and separately claimable.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various methods, protocols, and techniques according to the disclosure provided herein.

Exemplary aspects are directed toward a method of generating reporting data relating to an identification match relating to a probe image, the method comprising: automatically capturing a comparison area in the probe image and a comparison area of a candidate image based on examiner input; facilitating whether a similarity or a dissimilarity exists between the comparison area in the probe image and the comparison area of the candidate image; automatically recording metadata based on the determination of whether the similarity or the dissimilarity exists between the comparison area in the probe image and the comparison area of the candidate image and updating an audit log; and generating a report comprising the metadata.

Aspects of the above method include the method further comprising, prior to generating the report: automatically capturing a second comparison area in the probe image and a second comparison area of the candidate image based on examiner input; facilitating whether a second similarity or a second dissimilarity exists between the second comparison area in the probe image and the second comparison area of the candidate image; and automatically recording metadata based on the determination of whether the similarity or the dissimilarity exists between the second comparison area in the probe image and the second comparison area of the candidate image and updating the audit log.

Aspects of the above method include wherein the steps of capturing a second comparison area and facilitating whether a second similarity or dissimilarity exists repeats until a user determines the report should be finalized.

Aspects of the above method include wherein the report is displayed on a user interface.

Aspects of the above method include wherein the probe image comprises a fingerprint image.

Aspects of the above method include wherein the comparison area comprises a point of minutiae in the probe image.

Aspects of the above method include wherein the report is configured to be presented in a courtroom.

Aspects of the above method include wherein the metadata comprises data associated with a decision process of a fingerprint examiner.

Embodiments include a non-transitory computer readable information storage media having stored thereon instructions that, when executed by one or more processors, cause to be performed a method comprising: automatically capturing a comparison area in a probe image and a comparison area of a candidate image; facilitating whether a similarity or a dissimilarity exists between the comparison area in the probe image and the comparison area of the candidate image; automatically recording metadata based on the determination of whether the similarity or the dissimilarity exists between the comparison area in the probe image and the comparison area of the candidate image and updating an audit log; and generating a report comprising the metadata.

Aspects of the above media include wherein the method further comprises, prior to generating the report: automatically capturing a second comparison area in the probe image and a second comparison area of the candidate image; facilitating whether a second similarity or a second dissimilarity exists between the second comparison area in the probe image and the second comparison area of the candidate image; and automatically recording metadata based on the determination of whether the similarity or the dissimilarity exists between the second comparison area in the probe image and the second comparison area of the candidate image and updating the audit log.

Aspects of the above media include wherein the steps of capturing a second comparison area and facilitating whether a second similarity or dissimilarity exists repeats until a user determines the report should be finalized.

Aspects of the above media include wherein the report is displayed on a user interface.

Aspects of the above media include wherein the probe image comprises a fingerprint image.

Aspects of the above media include wherein the comparison area comprises a point of minutiae in the probe image.

Aspects of the above media include wherein the report is configured to be presented in a courtroom.

Aspects of the above media include wherein the metadata comprises data associated with a decision process of a fingerprint examiner.

Embodiments include a computing system in communication with a database containing gallery images, the computing system comprising: memory storing computer-readable program code; and a processor that, in response to executing the computer-readable program code stored in the memory: automatically captures a comparison area in a probe image and a comparison area of a candidate image; facilitates whether a similarity or a dissimilarity exists between the comparison area in the probe image and the comparison area of the candidate image; automatically records metadata based on the determination of whether the similarity or the dissimilarity exists between the comparison area in the probe image and the comparison area of the candidate image and updating an audit log; and generates a report comprising the metadata.

Aspects of the above computer system include wherein the processor further, prior to generating the report, automatically captures a second comparison area in the probe image and a second comparison area of the candidate image; facilitates whether a second similarity or a second dissimilarity exists between the second comparison area in the probe image and the second comparison area of the candidate image; and automatically records metadata based on the determination of whether the similarity or the dissimilarity exists between the second comparison area in the probe image and the second comparison area of the candidate image and updating the audit log.

Aspects of the above computer system include wherein the steps of capturing a second comparison area and facilitating whether a second similarity or dissimilarity exists repeats until a user determines the report should be finalized.

Aspects of the above computer system include wherein the probe image comprises a fingerprint image.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The systems, methods and protocols illustrated herein can be implemented in hardware and/or software using any known or later developed systems or structures, devices and/or software by those of ordinary skill in the applicable art from the functional description provided herein and with a general basic knowledge of the computer and bioinformatics arts.

Moreover, the disclosed methods may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a fingerprint device.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

It is therefore apparent that there has at least been provided systems and methods for reference point independent database filtering. While the embodiments have been described in conjunction with a number of embodiments, it is evident that many alternatives, modifications, and variations would be or are apparent to those of ordinary skill in the applicable arts. Accordingly, this disclosure is intended to embrace all such alternatives, modifications, equivalents, and variations that are within the spirit and scope of this disclosure.

What is claimed is:

1. A method of generating reporting data relating to an identification match relating to a probe image, the method comprising:
   automatically capturing a comparison area in the probe image and a comparison area of a candidate image based on examiner input;
   facilitating a determination of whether a similarity or a dissimilarity exists between the comparison area in the probe image and the comparison area of the candidate image;
   automatically recording metadata based on the determination of whether the similarity or the dissimilarity exists between the comparison area in the probe image and the comparison area of the candidate image and updating an audit log; and
   generating a report comprising the metadata.

2. The method of claim 1, further comprising, prior to generating the report:
   automatically capturing a second comparison area in the probe image and a second comparison area of the candidate image based on examiner input;
   facilitating a determination of whether a second similarity or a second dissimilarity exists between the second comparison area in the probe image and the second comparison area of the candidate image; and
   automatically recording metadata based on the determination of whether the similarity or the dissimilarity exists between the second comparison area in the probe image and the second comparison area of the candidate image and updating the audit log.

3. The method of claim 2, wherein the steps of capturing a second comparison area and facilitating whether a second similarity or dissimilarity exists repeats until a user determines the report should be finalized.

4. The method of claim 1, wherein the report is displayed on a user interface.

5. The method of claim 1, wherein the probe image comprises one or more of a fingerprint image, an interdigital image, a palm image, a writer's palm image, a footprint image, and an image of a ridge flow.

6. The method of claim 1, wherein the comparison area comprises a point of minutiae in the probe image.

7. The method of claim 1, wherein the report is configured to be presented in a courtroom.

8. The method of claim 1, wherein the report is configured to be presented to a second examiner for verification of the decision.

9. The method of claim 1, wherein the metadata comprises data associated with a decision process of a fingerprint examiner.

10. A non-transitory computer readable information storage media having stored thereon instructions that, when executed by one or more processors, cause to be performed a method comprising:

automatically capturing a comparison area in a probe image and a comparison area of a candidate image;

facilitating a determination of whether a similarity or a dissimilarity exists between the comparison area in the probe image and the comparison area of the candidate image;

automatically recording metadata based on the determination of whether the similarity or the dissimilarity exists between the comparison area in the probe image and the comparison area of the candidate image and updating an audit log; and generating a report comprising the metadata.

11. The media of claim 10, wherein the method further comprises, prior to generating the report:

automatically capturing a second comparison area in the probe image and a second comparison area of the candidate image;

facilitating a determination of whether a second similarity or a second dissimilarity exists between the second comparison area in the probe image and the second comparison area of the candidate image; and automatically recording metadata based on the determination of whether the similarity or the dissimilarity exists between the second comparison area in the probe image and the second comparison area of the candidate image and updating the audit log.

12. The media of claim 11, wherein the steps of capturing a second comparison area and facilitating whether a second similarity or dissimilarity exists repeats until a user determines the report should be finalized.

13. The media of claim 10, wherein the report is displayed on a user interface.

14. The media of claim 10, wherein the probe image comprises one or more of a fingerprint image, an interdigital image, a palm image, a writer's palm image, a footprint image, and an image of a ridge flow.

15. The media of claim 10, wherein the comparison area comprises a point of minutiae in the probe image.

16. The media of claim 10, wherein the report is configured to be presented in a courtroom.

17. The media of claim 10, wherein the report is configured to be presented to an examiner for verification of the determination.

18. The media of claim 10, wherein the metadata comprises data associated with a decision process of a fingerprint examiner.

19. A computing system in communication with a database containing gallery images, the computing system comprising:

non-transitory computer-readable memory storing computer-readable program code; and a processor that, in response to executing the computer-readable program code stored in the memory:

automatically captures a comparison area in a probe image and a comparison area of a candidate image;

facilitates a determination of whether a similarity or a dissimilarity exists between the comparison area in the probe image and the comparison area of the candidate image;

automatically records metadata based on the determination of whether the similarity or the dissimilarity exists between the comparison area in the probe image and the comparison area of the candidate image and updating an audit log; and generates a report comprising the metadata.

20. The computer system of claim 19, wherein the processor further, prior to generating the report, automatically captures a second comparison area in the probe image and a second comparison area of the candidate image;

facilitates whether a second similarity or a second dissimilarity exists between the second comparison area in the probe image and the second comparison area of the candidate image; and automatically records metadata based on the determination of whether the similarity or the dissimilarity exists between the second comparison area in the probe image and the second comparison area of the candidate image and updating the audit log.

* * * * *